United States Patent
Hsu

(10) Patent No.: US 7,354,193 B2
(45) Date of Patent: Apr. 8, 2008

(54) CLAMPING DEVICE WITH FLEXIBLE CONTACT FOR HEAT PIPE

(75) Inventor: Hul-Chun Hsu, Taichung (TW)

(73) Assignee: Jaffe Limited, Tortola (VG)

( * ) Notice: Subject to any disclaimer, the term of this patent is extended or adjusted under 35 U.S.C. 154(b) by 0 days.

(21) Appl. No.: 11/285,029

(22) Filed: Nov. 23, 2005

(65) Prior Publication Data

US 2007/0116087 A1    May 24, 2007

(51) Int. Cl.
*G01K 7/00* (2006.01)
*G01K 1/14* (2006.01)
*G01K 13/00* (2006.01)

(52) U.S. Cl. ............... 374/147; 374/179; 374/208; 136/221

(58) Field of Classification Search .......... 136/230, 136/221; 374/147, 179, 208
See application file for complete search history.

(56) References Cited

U.S. PATENT DOCUMENTS

| | | | | |
|---|---|---|---|---|
| 2,979,650 A | * | 4/1961 | Godshalk et al. | 320/105 |
| 4,091,672 A | * | 5/1978 | Amrine et al. | 374/147 |
| 4,121,460 A | * | 10/1978 | Ekstrom | 374/180 |
| 4,253,334 A | * | 3/1981 | Hakansson et al. | 374/170 |
| 4,265,117 A | * | 5/1981 | Thoma et al. | 136/221 |
| 4,454,370 A | * | 6/1984 | Voznick | 136/221 |
| 4,527,005 A | * | 7/1985 | McKelvey et al. | 136/221 |
| 4,759,895 A | * | 7/1988 | Fortune et al. | 374/179 |
| 5,297,716 A | * | 3/1994 | Smith et al. | 228/8 |
| 5,441,344 A | * | 8/1995 | Cook, III | 374/141 |
| 6,257,758 B1 | * | 7/2001 | Culbertson | 374/120 |
| 6,779,919 B1 | * | 8/2004 | Staniforth et al. | 374/147 |
| 2006/0227848 A1 | * | 10/2006 | Huang | 374/179 |
| 2006/0274814 A1 | * | 12/2006 | Wang | 374/208 |
| 2007/0055171 A1 | * | 3/2007 | Fraden | 600/549 |

FOREIGN PATENT DOCUMENTS

GB      2034111 A  *  5/1980
JP    06137955 A  *  5/1994

* cited by examiner

*Primary Examiner*—Gail Verbitsky
*Assistant Examiner*—Mirellys Jagan

(57) ABSTRACT

A clamping device with flexible contact for heat pipe includes a clamping body and a thermal couple wire. The clamping body includes a clamping section formed by at least two claws. The thermal couple wire has one end enclosing a pressing element and includes a temperature-sensing head at end of the pressing element. A first clamping block is provided on the claw and comprises an accommodating space. An opening is defined at end of the accommodating space near the first clamping block. The pressing element is elastically pressed in the accommodating space such that the temperature-sensing head is exposed out of the opening.

4 Claims, 3 Drawing Sheets

CLAMPING DEVICE WITH FLEXIBLE CONTACT FOR HEAT PIPE

BACKGROUND OF THE INVENTION

1. Field of the Invention

The present invention relates to a clamping device with flexible contact for heat pipe, more particularly, to a clamping device with flexible contact for heat pipe, which can fast measure temperature for the heat pipe and has flexible contact with heat pipe.

2. Description of Prior Art

The conventional heat pipe needs examination for heat conduction amount after a batch of heat pipes are manufactured. However, the conventional examination instruments or equipments are expensive and the operation thereof is cumbersome and time consuming. For example, the thermal couple wire is connected to surface of the heat pipe by using binding tape. Therefore, the examination of heat pipe is conducted in sampling fashion instead of entire examination. Certain amount of heat pipes are sampled for inspection to estimate the yield for one batch.

However, as the demanding on the quality of heat pipe is increased, the examination of heat pipe by sampling is not sufficient. Therefore, each of the manufactured heat pipes is needed to be examined. This process is cumbersome and the current examination instruments or equipments are not applicable for fast and individual examination for the heat pipe.

SUMMARY OF THE INVENTION

It is an object of the present invention to provides a clamping device with flexible contact for heat pipe, the clamping device can fast clamps a heat pipe during phase change. The clamping device has a contact with a surface portion of the heat pipe to measure temperature at the surface portion of the heat pipe. The clamping device has flexible contact such that the temperature measuring portion has good contact with the heat pipe when the clamping device with flexible contact holds the heat pipe.

It is another object of the present invention to provides a clamping device with flexible contact for heat pipe, which can heat and cool the heated end and cooled end of the heat pipe and measure temperature thereof, whereby the temperature at the heated end and cooled end of the heat pipe can be precisely measured.

Accordingly, the present invention provides a clamping device with flexible contact for heat pipe, which includes a clamping body and a thermal couple wire. The clamping body includes a clamping section formed by at least two claws. The thermal couple wire has one end enclosing a pressing element and includes a temperature-sensing head at end of the pressing element. A first clamping block is provided on the claw and comprises an accommodating space. An opening is defined at end of the accommodating space near the first clamping block. The pressing element is elastically pressed in the accommodating space such that the temperature-sensing head is exposed out of the opening.

Accordingly, the present invention provides a clamping device with flexible contact for heat pipe, which further includes a second clamping block pivotally arrange on another one of the claws and made of material with good thermal conductivity. The second clamping block includes heating area and cooling area to cool the heated end and cooled end of the heat pipe and measure temperature thereof, whereby the temperature at the heated end and cooled end of the heat pipe can be precisely measured.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 1:
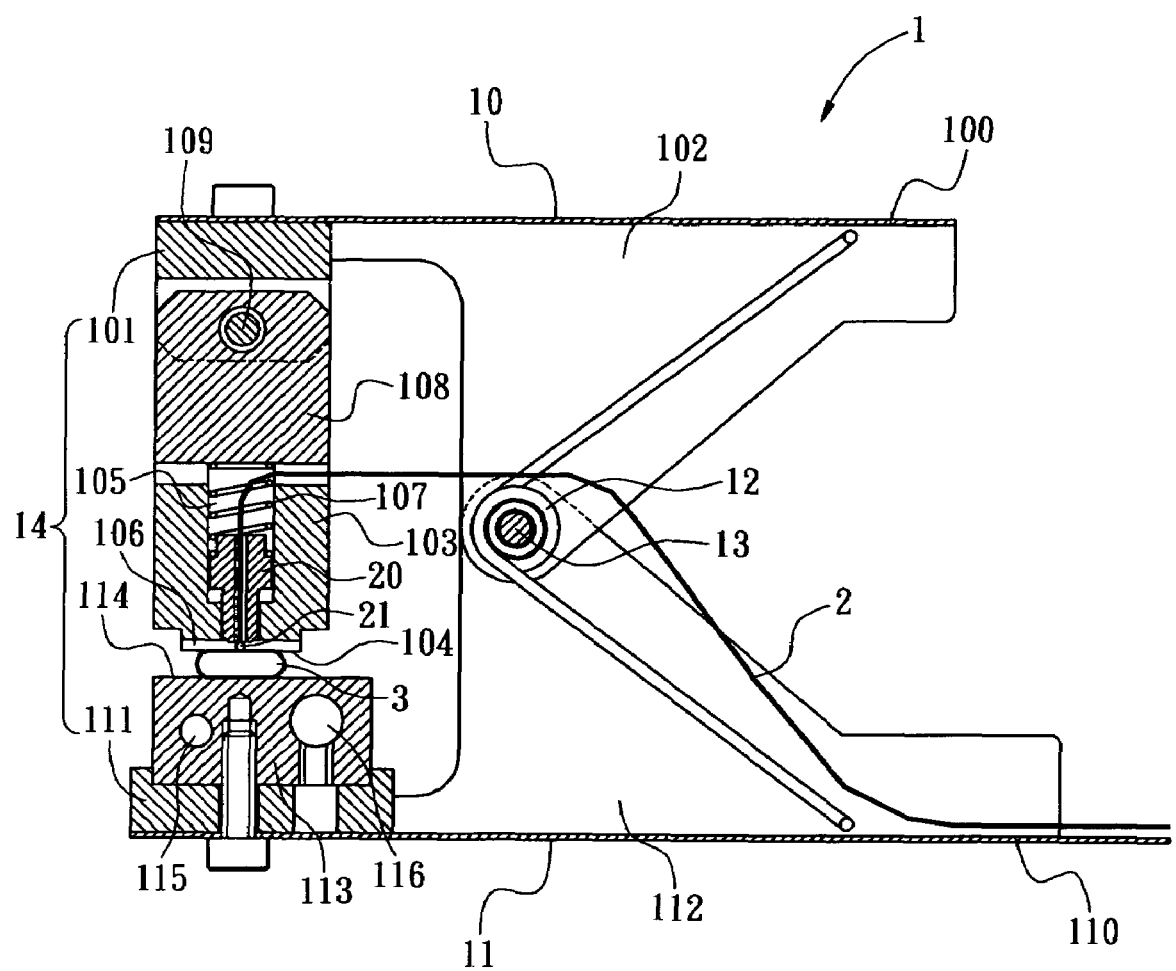
FIG. 1 shows a sectional view of the clamping device of the present invention in the operation of clamping heat pipe.
Figure 2:
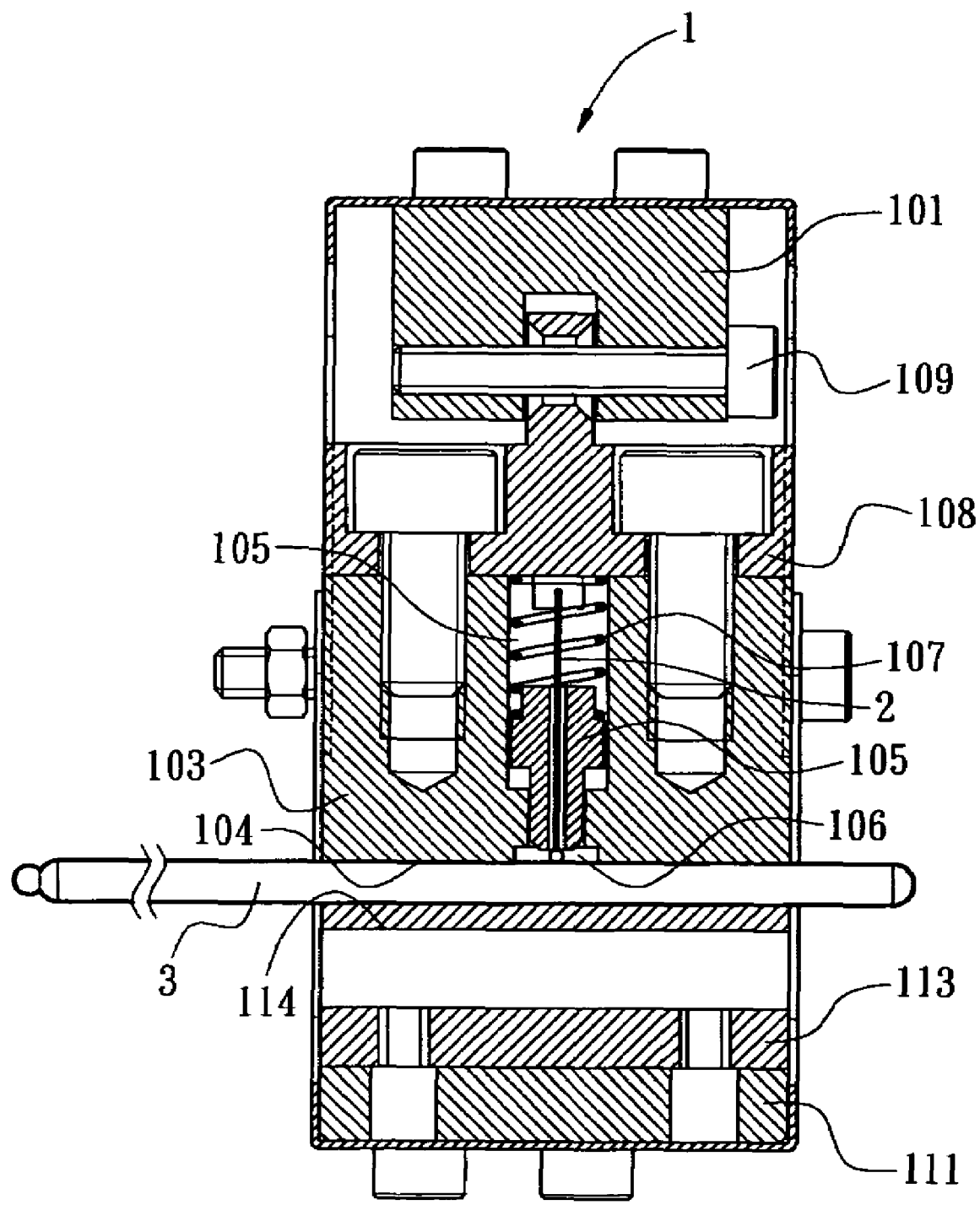
FIG. 2 shows another sectional view of the clamping device of the present invention in the operation of clamping heat pipe.

FIGS. 1 and 2 show two sectional view of the clamping device of the present invention in the operation of clamping heat pipe. The present invention provides a clamping device with flexible contact for heat pipe, which is used to clamp the surface of the heat pipe 3 in phase change. Therefore, the surface temperature of the heat pipe 3 can be fast measured. The clamping device comprises a clamping body 1 and a thermal couple wire 2.

Figure 3:
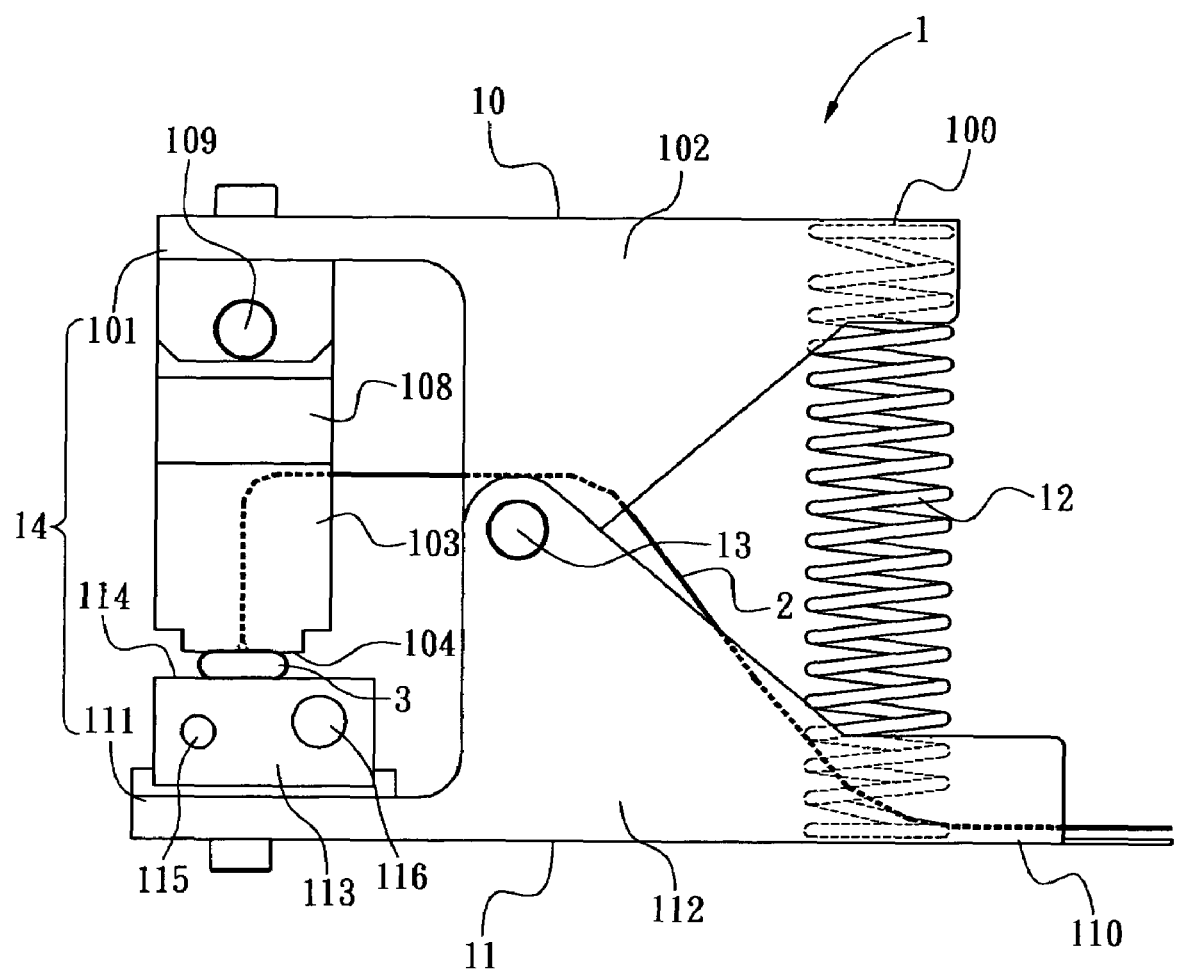
FIG. 3 shows a sectional view of the clamping device according to another preferred embodiment of the present invention.

In the shown preferred embodiment, the clamping body 1 further comprises a first grip 10, a second grip 11 and a spring element 12 provided between the first grip 10 and the second grip 11. The first grip 10 and the second grip 11 are opposite to each other and comprise handles 100, 110 and claws 101, 111, respectively. The first grip 10 and the second grip 11 further comprise pivotal sections 102, 112 near the handles 100, 110 and a pivotal shaft 13 pivotally connected between the pivotal sections 102, 112. The spring element 12 is a compression spring as shown in FIG. 3 to form a clamping body 1 with elastic clamping force. When pressure is exerted on the handles 100, 110 of the first grip 10 and the second grip 11, the claws 101, 111 of first grip 10 and the second grip 11 are opened to a clamping state. Therefore the clamping body 1 now has a clamping section 14 formed by the opened claws 101, 111.

In the present invention, the clamping body 1 provides fast clamping operation for the heat pipe 3 to help to measure the surface temperature of the heat pipe 3. Moreover, a good contact is sustained between the heat pipe 3 and a temperature-sensing device. The thermal couple wire 2 is provided on one of the claws 101, 111 of first grip 10 and the second grip 11. One end of the thermal couple wire 2 encloses a pressing element 20 and the thermal couple wire 2 can be fixed to the pressing element 20 by glue. A temperature-sensing head 21 is formed at end of the thermal couple wire 2, where the thermal couple wire 2 is fixed to the pressing element 20. The temperature-sensing head 21 can be formed by soldering an exposed end of the thermal couple wire 2 such that a ball-like temperature-sensing head 21 is formed at the end of the thermal couple wire 2.

The temperature-sensing head 21 further ensures a stable contact to the heat pipe during temperature measurement. A first clamping block 103 is provided on inner side of the claw 101 and comprises a clamping face 104 in contact with the surface of the heat pipe 3. An accommodating space 105 is defined in the first clamping block 103 and an opening 106 is defined at end of the accommodating space 105 near the first clamping block 103 as shown in FIG. 2. After the pressing element 20 is provided in the accommodating space 105, a spring unit 107 presses the pressing element 20 in the accommodating space 105 and the temperature-sensing head 21 is exposed out of the opening 106.

The first clamping block 103 is pivotally arranged on inner side of the claw 101. In the preferred embodiment, the first clamping block 103 is locked to a pivot block 108 and the pivot block 108 is pivotally connected to inner side of the claw 101 through a pivot shaft 109. Therefore, the first clamping block 103 has flexible clamping angle on surface of the heat pipe when the claw 103 clamps the heat pipe 3.

Moreover, a second clamping block 113 is arranged on inner side of the claw 111 and the second clamping block 113 is made of material with good thermal conductivity. The second clamping block 113 has a clamping face 114 in contact with the surface of the heat pipe 3 and clamps firmly the heat pipe 3 with the clamping face 104 of the first clamping block 103. When the clamping face 104 of the first clamping block 103 is attached to surface of the heat pipe 3, the temperature-sensing head 21 has substantial contact with the heat pipe 3 by the spring force of the spring unit 107.

A heater (not shown) for controlling heating amount and temperature is arranged on the second clamping block 113 and/or a cooling water conduit (not shown) connected to cooling water supply is arranged on the second clamping block 113. Alternatively, a heating area 115 and/or a cooling area 116 are provided on the second clamping block 113 to accommodate the heater and the cooling water conduit. Therefore, two clamping bodies 1 can be used to clamp the heated end and the cooled end of the heat pipe 3, where the two clamping bodies 1 are equipped with heater and cooling water conduit, respectively. The heater and cooling water conduit can heat and cool two ends of the heat pipe, respectively. The two clamping bodies 1 can also measure temperature at the heated end and the cooled end of the heat pipe 3.

The clamping body 1 can sense a measure temperature signal to another end through the thermal couple wire 2. Another end of the thermal couple wire 2 is connected to a temperature sensor (not shown) to show the measured temperature. The clamping body can fast clamp the heat pipe and fast release the heat pipe after measurement is finished. Therefore, the clamping device with flexible contact for heat pipe can facilitate the temperature measurement for other portion of the heat pipe 3 or the temperature measurement for next heat pipe. The time for examining a single heat pipe can be saved and the clamping device with flexible contact for heat pipe can facilitate the temperature measurement for a batch of heat pipes.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A clamping device with flexible contact for a heat pipe, comprising:
    a clamping body comprising a clamping section formed by two claws;
    a first clamping block pivotally mounted on one of the claws, and having an accommodating space therein, wherein an opening is formed at an end of the accommodating space;
    a pressing element received in the accommodating space and pressed by a spring unit; and
    a thermal couple wire passing through the pressing element, and an end of the thermal couple wire having a temperature-sensing head at one end thereof protruding from the pressing element and exposing out of the opening.

2. The clamping device with flexible contact for a heat pipe as in claim 1, wherein the first clamping block is fixed to a pivot block and the pivot block is pivotally connected to the claw by a pivot shaft.

3. The clamping device with flexible contact for a heat pipe as in claim 1, wherein the thermal couple wire is fixed to the pressing element by glue.

4. The clamping device with flexible contact for a heat pipe as in claim 1, wherein the temperature-sensing head is of a ball shape.

* * * * *